United States Patent
Sugie

(10) Patent No.: US 11,018,607 B2
(45) Date of Patent: May 25, 2021

(54) MOTOR DRIVER DEVICE, SEMICONDUCTOR DEVICE, AND ELECTRONIC DEVICE INCLUDING THE SAME

(71) Applicant: Rohm Co., Ltd., Kyoto (JP)

(72) Inventor: Hisashi Sugie, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/595,726

(22) Filed: Oct. 8, 2019

(65) Prior Publication Data

US 2020/0119668 A1   Apr. 16, 2020

(30) Foreign Application Priority Data

Oct. 11, 2018   (JP) .............................. JP2018-192368

(51) Int. Cl.
| | |
|---|---|
| H02M 1/12 | (2006.01) |
| H02P 6/182 | (2016.01) |
| H02P 25/03 | (2016.01) |
| H02P 6/28 | (2016.01) |
| G11B 25/04 | (2006.01) |
| G11B 19/28 | (2006.01) |
| G11B 19/20 | (2006.01) |
| H02P 25/034 | (2016.01) |

(52) U.S. Cl.
CPC .......... *H02P 6/182* (2013.01); *G11B 19/2009* (2013.01); *G11B 19/2063* (2013.01); *G11B 19/28* (2013.01); *G11B 25/043* (2013.01); *H02P 6/28* (2016.02); *H02P 25/03* (2016.02); *H02P 25/034* (2016.02)

(58) Field of Classification Search
CPC . H02P 7/29; H03K 7/08; H03K 17/28; H02M 1/38
See application file for complete search history.

(56) References Cited

U.S. PATENT DOCUMENTS

| | | | |
|---|---|---|---|
| 7,126,304 B2 * | 10/2006 | Suzuki ................... | B62D 5/046 318/400.04 |
| 2004/0037097 A1 * | 2/2004 | Deng ................. | H02M 7/53803 363/41 |
| 2009/0179603 A1 * | 7/2009 | Chen ........................ | H02P 6/20 318/400.33 |

FOREIGN PATENT DOCUMENTS

| | | |
|---|---|---|
| JP | H10-341588 | 12/1998 |
| JP | 2010-004733 | 1/2010 |

(Continued)

*Primary Examiner* — Muhammad S Islam
(74) *Attorney, Agent, or Firm* — Fish & Richardson P.C.

(57) ABSTRACT

A motor driver device includes: a driver driving a motor by a driving method, wherein the driving method includes: a first driving method performing driving control of the motor based on zero cross timing of back electromotive force generated in a coil of a predetermined phase; and a second driving method performing driving control of the motor such that a first differential phase between zero cross timing of driving current flowing through the coil of the predetermined phase and zero cross timing of driving voltage applied to the coil of the predetermined phase coincides with predetermined first target phase, and wherein, even when the motor is being driven by the first driving method, the first differential phase is sequentially detected and, when transition from the first driving method to the second driving method occurs, the first differential phase detected immediately before the transition is set to the first target phase.

9 Claims, 12 Drawing Sheets

(56) References Cited

FOREIGN PATENT DOCUMENTS

JP        6231357      10/2017
WO    2009/150794    12/2009

* cited by examiner

MOTOR DRIVER DEVICE, SEMICONDUCTOR DEVICE, AND ELECTRONIC DEVICE INCLUDING THE SAME

CROSS-REFERENCE TO RELATED APPLICATION

This application is based upon and claims the benefit of priority from Japanese Patent Application No. 2018-192368, filed on Oct. 11, 2018, the entire contents of which are incorporated herein by reference.

TECHNICAL FIELD

The present disclosure relates to a motor driver device, a semiconductor device, and an electronic device.

BACKGROUND

In a motor such as a brushless DC motor that does not include a commutation mechanism by brush, it is necessary to switch a direction of a current supplied to a coil according to a position of a rotor. As driving methods of the brushless DC motor, a method of using position information of a rotor obtained from a Hall element and a sensorless method of estimating a position of the rotor based on a zero cross point of back electromotive force (induced voltage) generated in a coil without using the Hall element are widely known.

As control methods of three-phase brushless motor, a 120-degree conducting method (rectangular wave driving) and a 180-degree conducting method (sinusoidal wave driving) are widely used. The 120-degree conducting method has an advantage of being relatively easy to control, whereas the 180-degree conducting method has an advantage of being relatively good in quietness and vibration characteristics.

In the sensorless method, the current flowing through the coil must be zero in order to detect the back electromotive force. In the 120-degree conducting method, since a non-conducting section is set for a coil of each phase, the back electromotive force can be easily detected by using the non-conducting section. On the other hand, in the 180-degree conducting method, since the current always flows through each coil, the non-conducting section cannot be used as in the 120-degree conducting method. Therefore, in the 180-degree conducting method of the related art, a method in which a window section including a time at which the zero cross point of the back electromotive force will occur is set and an output of a driver is forcibly set in a high impedance state in the window section (hereinafter, referred to as a window driving method for the sake of convenience) is used. However, the setting of the window section may disturb the quietness or the like which is the original advantage of the 180-degree conducting method.

In consideration with this, a method that does not require the output of the driver to be forcibly set in a high impedance state (hereinafter, referred to as a windowless driving method for the sake of convenience) has also been proposed. In the windowless driving method of the related art, a polarity inversed timing of current flowing through the coil (a timing at which a direction of the current flowing through the coil is inverted) is detected by using at least a terminal voltage of the coil. Phase information of the current is acquired by periodically detecting (sampling) the polarity of the current, and a driving control signal which is pulse-width modulated may be generated based on the acquired phase information. Then, the motor can be sensorlessly driven by supplying a driving voltage having a duty based on the driving control signal to the coil of each phase.

In such a motor driver device, however, further improvement in controlling a transition from the window driving method to the windowless driving method is needed.

SUMMARY

Some embodiments of the present disclosure provide a motor driver device capable of smoothly performing a transition from a window driving method to a windowless driving method.

According to an embodiment of the present disclosure, a motor driver device is provided. The motor driver device includes: a driver configured to drive a motor by a driving method, wherein the driving method includes: a first driving method that performs driving control of the motor based on a zero cross timing of a back electromotive force generated in a coil of a predetermined phase; and a second driving method that performs driving control of the motor such that a first differential phase between a zero cross timing of a driving current flowing through the coil of the predetermined phase and a zero cross timing of a driving voltage applied to the coil of the predetermined phase coincides with a predetermined first target phase, and wherein, even when the motor is being driven by the first driving method, the first differential phase is sequentially detected and, when a transition from the first driving method to the second driving method occurs, the first differential phase detected immediately before the transition is set to the first target phase.

In some embodiments, the transition from the first driving method to the second driving method may occur after a rotational speed of the motor is stabilized by the first driving method.

In some embodiments, a fixed value may be selectable as the first target phase.

In some embodiments, in the second driving method, when the first differential phase is larger than the first target phase, a rotational speed of the motor is lowered, and when the first differential phase is smaller than the first target phase, the rotational speed of the motor is raised.

In some embodiments, when the motor is being driven by the first driving method, an automatic advance adjustment operation may be performed such that a second differential phase between the zero cross timing of the back electromotive force and the zero cross timing of the driving current coincides with a predetermined second target phase.

In some embodiments, the transition from the first driving method to the second driving method may await until the automatic advance adjustment operation is completed.

In some embodiments, in the automatic advance adjustment operation, when the second differential phase is larger than the second target phase, an advance amount is decreased, and when the second differential phase is smaller than the second target phase, the advance amount is increased.

According to another embodiment of the present disclosure, a semiconductor device formed by integrating the motor driver device is provided.

According to another embodiment of the present disclosure an electronic device is provided. The electronic device includes: the semiconductor device; and the motor driven by using the semiconductor device In some embodiments, the motor may be a spindle motor configured to rotate a disk.

DETAILED DESCRIPTION

Figure 1:
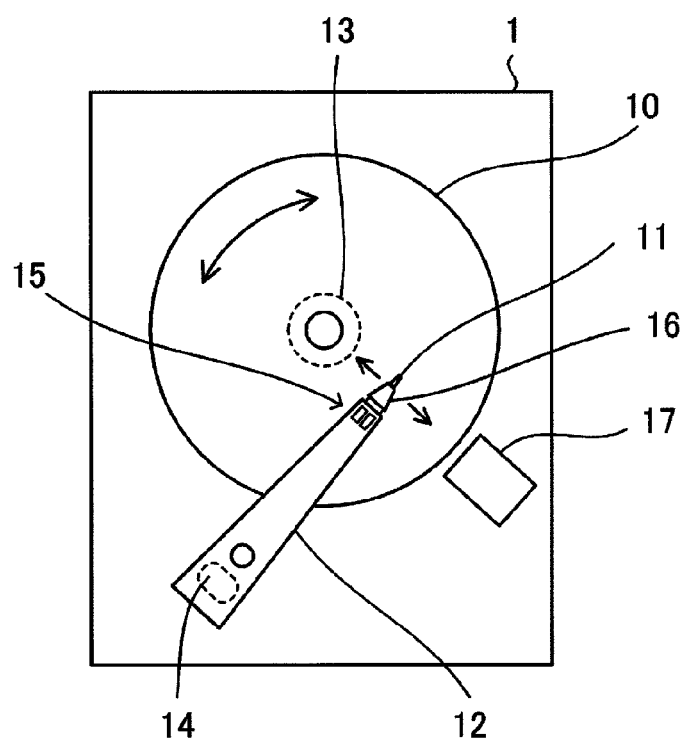
FIG. 1 is a schematic configuration diagram of a mechanism of a hard disk device.

Exemplary embodiments of the present disclosure will be now described in detail with reference to the drawings. In each of the drawings to be referred to, like parts are denoted by like reference numerals and a repeated description thereof will be omitted in principle. Further, in the present disclosure, for the simplification of description, names of information, signals, physical quantities, members, or the like may be omitted or abbreviated by specifying reference symbols or numerals referring to the information, signals, physical quantities, members, or the like. For example, a high-side transistor referred to by "TrH" as described later may be expressed as a high-side transistor TrH or may be abbreviated as a transistor TrH, but they all refer to the same one.

First, some terms used in the present embodiment will be described.

In the present embodiment, a level may refer to a potential level, in which a high level has a potential higher than a low level for an arbitrary signal or voltage. A ground may refer to a conductive part having a reference potential of zero volt (0 V) or to the reference potential itself. In the present embodiment, a voltage indicated without a specific reference may indicate a potential seen from the ground.

For an arbitrary transistor configured as a field effect transistor (FET) including transistors TrH and TrL which will be described later, an ON state refers to a conductive state between a drain and a source of the transistor, and an OFF state refers to a non-conductive state (cut-off state) between the drain and the source of the transistor. The ON state and the OFF state may be simply expressed as ON and OFF.

Hard Disk Device

FIG. 1 is a schematic configuration diagram of a mechanism of a hard disk device 1 (hereinafter, referred to as an HDD device 1) as a magnetic disk device according to an embodiment of the present disclosure.

The HDD device 1 includes a magnetic disk 10 which is a recording medium, a magnetic head 11 (hereinafter, also referred to as a head 11) which writes and reads information into and from the magnetic disk 10, an arm 12 which movably and freely supports the magnetic head 11 in a radial direction of the magnetic disk 10, a spindle motor 13 (hereinafter, also referred to as an SPM 13) which supports and rotates the magnetic disk 10, and a voice coil motor 14 (hereinafter, also referred to as a VCM 14) which moves and positions the magnetic head 11 in the radial direction of the magnetic disk 10 by rotatably driving and positioning the arm 12.

The HDD device 1 further includes a pair of piezoelectric elements 15, a load beam 16, and a ramp part 17 which holds the magnetic head 11 at a predetermined retraction position separated from the magnetic disk 10. The load beam 16 is attached to a leading end of the arm 12, and the magnetic head 11 is attached to a leading end of the load beam 16. The pair of piezoelectric elements 15 are disposed near the attachment portion of the load beam 16 at the leading end of the arm 12. By applying voltages having opposite phases to the pair of piezoelectric elements 15, the pair of piezoelectric elements 15 can expand and contract in the opposite phases to displace the magnetic head 11 at the leading end of the load beam 16 in the radial direction of the magnetic disk 10.

As described above, the HDD device 1 adopts a so-called two-stage actuator system. The VCM 14 functions as a coarse actuator which roughly positions (positions with relatively coarse resolution) the magnetic head 11 on the magnetic disk 10 by driving the arm 12, and the pair of piezoelectric elements 15 function as a fine actuator which precisely positions (positions with finer resolution than that of the VCM 14) the magnetic head 11 on the magnetic disk 10 by adjusting the position of the magnetic head 11 with respect to the position of the arm 12. Hereinafter, the actuator including the pair of piezoelectric elements 15 will be referred to as an MA 15 using an abbreviation "MA" of a microactuator.

The magnetic disk 10, the magnetic head 11, the arm 12 to which the MA 15 and the load beam 16 are attached, the SPM 13, the VCM 14, and the ramp part 17 are received in a housing of the HDD device 1. Furthermore, with respect to the movement and displacement of the magnetic head 11 by the VCM 14 or the MA 15, the movement and displacement of the magnetic disk 10 in the radial direction may indicate the movement and displacement in a direction connecting the outer periphery and the center of the magnetic disk 10 having a disk shape. However, the movement and displacement of the magnetic head 11 by the VCM 14 or the MA 15 may include components of movement and displacement in another direction (for example, a tangential direction of the outer periphery of the magnetic disk 10), in addition to the movement and displacement of the magnetic disk 10 in the radial direction.

Figure 2:
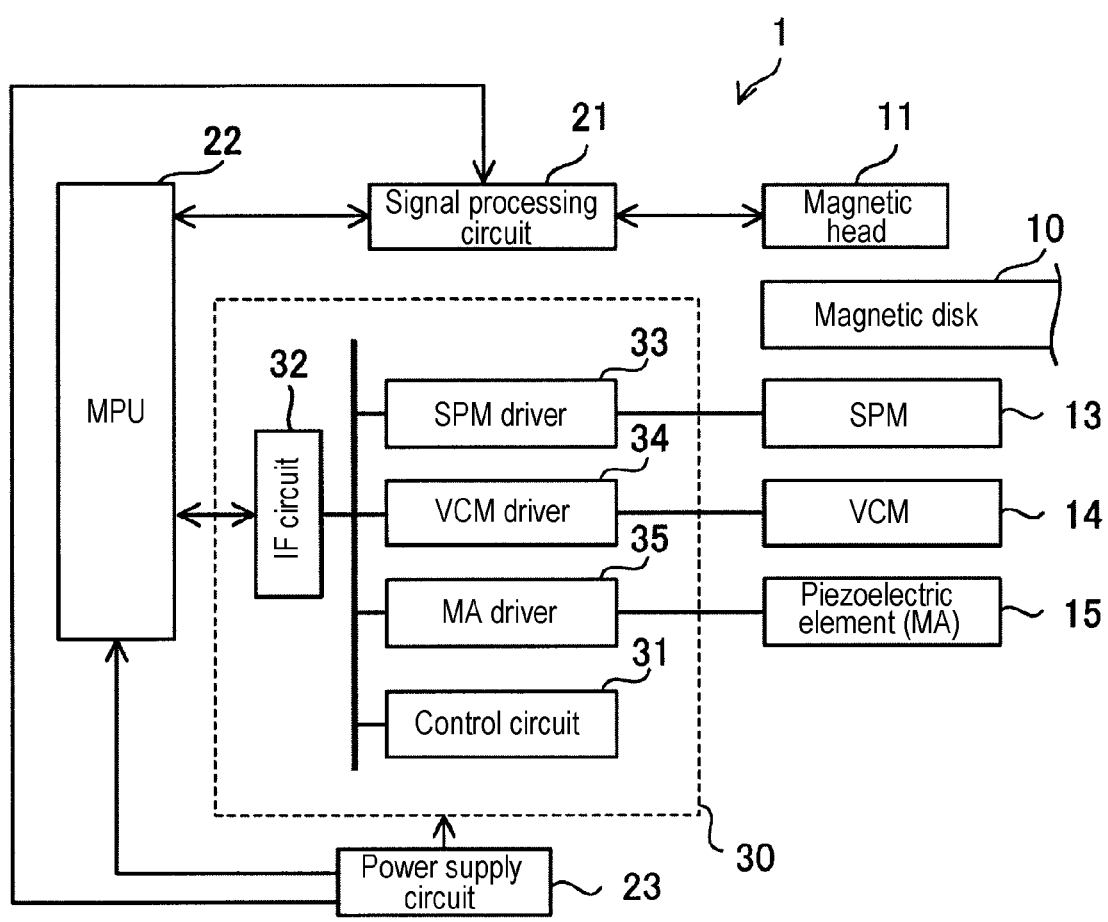
FIG. 2 is a schematic electrical block diagram of the hard disk device.

FIG. 2 is a schematic electrical block diagram of the HDD device 1. A driver IC 30, a signal processing circuit 21, a micro-processing unit (MPU) 22, and a power supply circuit 23 as electrical components are installed in the HDD device 1. The power supply circuit 23 supplies a power supply voltage for driving the driver IC 30, the signal processing circuit 21, and the MPU 22, to the driver IC 30, the signal processing circuit 21, and the MPU 22. The MPU 22 is connected to each of the signal processing circuit 21 and the driver IC 30 in the form capable of two-way communication.

When writing information (data) into the magnetic disk 10, the signal processing circuit 21 outputs a recording signal for writing the information to the magnetic head 11, and when reading information (data) from the magnetic disk 10, it performs necessary signal processing on a signal read from the magnetic disk 10 and sends the resulting signal to the MPU 22. The MPU 22 controls writing and reading operations of information by the magnetic head 11 through the control of the signal processing circuit 21.

Figure 3:
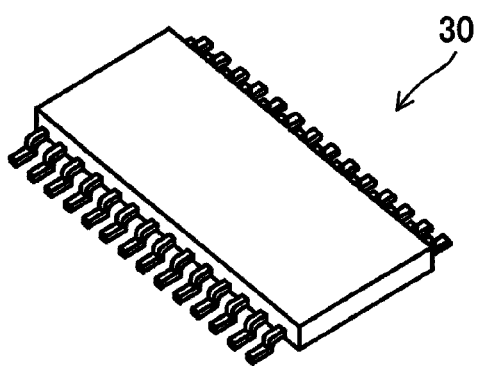
FIG. 3 is an external perspective view of a driver IC mounted on the hard disk device.

The driver IC 30 is an electronic component (driver device) formed by enclosing a semiconductor integrated circuit as illustrated in FIG. 3 in a housing (package) made of resin. The number of pins (number of external terminals) of the driver IC 30 illustrated in FIG. 3 is merely an example. An SPM driver 33 for driving and controlling the SPM 13, a VCM driver 34 for driving and controlling the VCM 14, and an MA driver 35 for driving and controlling the MA 15 are installed in the driver IC 30, and further, an interface circuit (IF circuit) 32 for enabling two-way communication between the MPU 22 and the driver IC 30, a control circuit 31 for controlling operations of the drivers 33 to 35 based on control data received from the MPU 22 via the IF circuit 32, and the like are installed therein.

The MPU 22 controls rotation of the magnetic disk 10 through the driving control of the SPM 13 by controlling the SPM driver 33 of the driver IC 30, and performs movement control and positioning of the magnetic head 11 through the driving control of the VCM 14 and the MA 15 by controlling the VCM driver 34 and the MA driver 35 of the driver IC 30. Position information indicating each position on the magnetic disk 10 is recorded at each position of the magnetic disk 10. When the magnetic head 11 is positioned on the magnetic disk 10, this position information is read by the magnetic head 11 and transmitted to the MPU 22 through the signal processing circuit 21. The MPU 12 can control the VCM driver 34 and the MA driver 35 based on the position information, by which the VCM driver 34 supplies a necessary driving current to the VCM 14, realizing first stage positioning of the magnetic head 11, and the MA driver 35 supplies a necessary voltage to the MA 15, realizing second stage positioning of the magnetic head 11. Furthermore, the positioning of the magnetic head 11 on the magnetic disk 10 may mean that the magnetic head 11 is positioned above the magnetic disk 10 with a minute space therebetween.

When the position information is not read by the magnetic head 11, such as when the magnetic head 11 is positioned outside the outer periphery of the magnetic disk 10, the MPU 22 can control the VCM driver 34 and the MA driver 35 without depending on the position information. For example, when moving the magnetic head 11 from the retraction position in the ramp part 17 onto the magnetic disk 10, the MPU 22 may output a signal instructing supply of a predetermined driving current suitable for the movement to the VCM 14 to the driver IC 30. Thus, the VCM driver 34 supplies the predetermined driving current based on the signal to the VCM 14. When the position information is not read by the magnetic head 111, since precise position control of the magnetic head 11 is not necessary, the supply voltage to the pair of piezoelectric elements 15 may be zero or may be a fixed voltage.

SPM and SPM Driver

Figure 4:
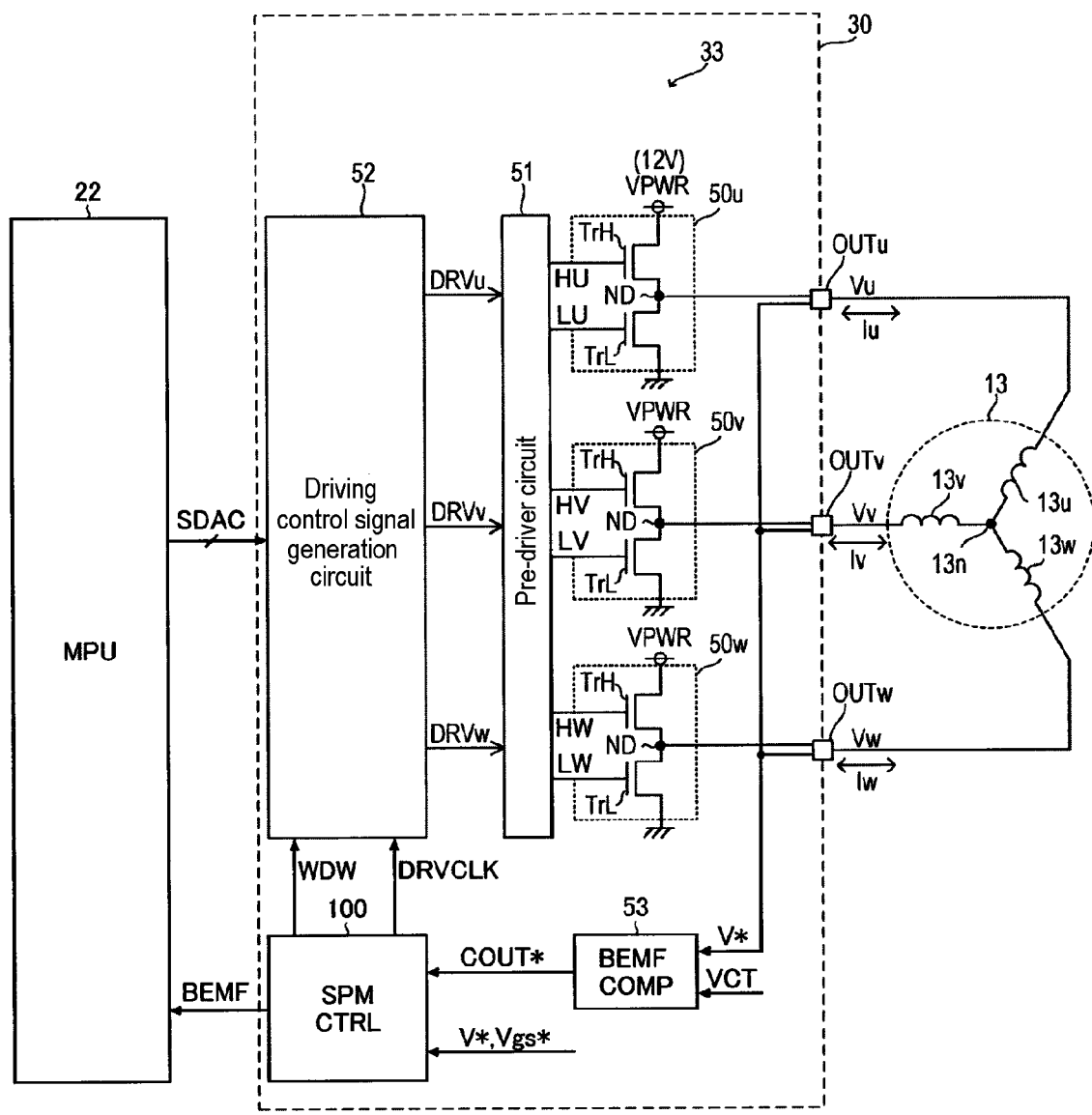
FIG. 4 is a configuration diagram of an SPM (spindle motor) and an SPM driver.

FIG. 4 illustrates an internal configuration of the SPM 13 and the SPM driver 33 and their connection relationship. External terminals installed in the driver IC 30 include terminals OUTu, OUTv, and OUTw. The SPM 13 is a three-phase brushless DC motor including a U-phase coil 13u, a V-phase coil 13v, and a W-phase coil 13w which are star-connected. The SPM 13 includes a stator and a rotor having permanent magnets, in which the coils 13u, 13v, and 13w are installed in the stator. One end of the coil 13u, one end of the coil 13v, and one end of the coil 13w are respectively connected to the external terminals OUTu, OUTv, and OUTw, and the other ends of the coils 13u, 13v, and 13w are commonly connected at a neutral point 13n. The external terminals OUTu, OUTv, OUTw may also be referred to as output terminals. Furthermore, in the following description, when the rotor is simply referred to, it will refer to the rotor of the SPM 13.

The SPM driver 33 includes a U-phase half-bridge circuit 50u, a V-phase half-bridge circuit 50v, a W-phase half-bridge circuit 50w, a pre-driver circuit 51, a driving control signal generation circuit 52, a back electro magnetic force (BEMF) comparator 53, and a SPM controller 100, and sensorlessly drives the SPM 13 by a window driving method or a windowless driving method. At this time, the SPM driver 33 may drive the SPM 13 by a 180-degree conducting method (sinusoidal wave driving).

Each of the half-bridge circuits 50u, 50v, and 50w includes a high-side transistor TrH and a low-side transistor TrL connected in series between a line to which a power supply voltage VPWR is applied, and a ground. The transistors TrH and TrL are configured as N-channel metal oxide semiconductor field effect transistors (MOSFETs). The power supply voltage VPWR is a predetermined positive DC voltage, and is assumed here to be 12 volts (V) as an example.

More specifically, in each of the half-bridge circuits 50u, 50v, and 50w, a drain of the transistor TrH is connected to a first power supply terminal to which the power supply voltage VPWR is applied, to receive the applied power supply voltage VPWR, and a source of the transistor TrH and a drain of the transistor TrL are commonly connected at a node ND and a source of the transistor TrL is connected to the ground that serves as a second power supply terminal. The nodes ND in the half-bridge circuits 50u, 50v, and 50w are respectively connected to the output terminals OUTu, OUTv, and OUTw. Therefore, the nodes ND in the half-bridge circuits 50u, 50v, and 50w are respectively connected to the one ends of the coils 13u, 13v, and 13w via the output terminals OUTu, OUTv, and OUTw. Voltages corresponding to voltages at the one ends of the coils 13u, 13v, and 13w and applied to the output terminals OUTu, OUTv, and OUTw are respectively represented by Vu, Vv, and Vw. The voltages Vu, Vv, and Vw are respectively supplied to the coils 13u, 13v, and 13w as driving voltages for the U phase, V phase, and W phase by the pre-driver circuit 51 and the half-bridge circuits 50u, 50v, and 50w.

The driving control signal generation circuit 52 generates and outputs a driving control signal DRVu for the half-bridge circuit 50u, a driving control signal DRVv for the half-bridge circuit 50v, and a driving control signal DRVw for the half-bridge circuit 50w depending on a driving clock signal DRVCLK and a window signal WDW input from the SPM controller 100. Furthermore, an m-bit (e.g., m=11) torque command signal SDAC for specifying a torque to be generated by the SPM 13 is supplied from the MPU 22 to the driving control signal generation circuit 52 via the IF circuit 32 (see FIG. 2). The driving control signal generation circuit 52 generates the driving control signals DRVu, DRVv, and DRVw so that the torque specified by the torque command signal SDAC is generated by the SPM 13. At this time, the driving control signal generation circuit 52 may generate the driving control signals DRVu, DRVv, and DRVw by referring to predetermined waveform data so that sinusoidal driving currents Iu, Iv, and Iw flow through the coils 13u, 13v, and 13w. Each of the driving control signals DRVu, DRVv, and DRVw is a binary signal whose pulse width is variable, and takes a high level or a low level.

The pre-driver circuit 51 controls states of the respective half-bridge circuits by controlling gate potentials (HU, LU, HV, LV, HW, and LW) of the respective transistors that respectively form the half-bridge circuits 50u, 50v, and 50w according to the driving control signals DRVu, DRVv, and DRVw. Accordingly, voltages obtained by switching the power supply voltage VPWR depending on the driving control signals DRVu, DRVv, and DRVw are applied as the driving voltages Vu, Vv, and Vw to the output terminals OUTu, OUTv, and OUTw, thereby switching and driving the SPM 13. In a target half-bridge circuit which is one of the half-bridge circuits 50u, 50v, and 50w, a state in which the transistor TrH is turned on and the transistor TrL is turned off will be referred to as an output high state, and a state in which the transistor TrH is turned off and the transistor TrL is turned on will be referred to as an output low state. Assuming that on resistances of the transistors TrH and TrL are zero, for example, in the half-bridge circuit 50u, when it is in the output high state, the power supply voltage VPWR is applied to the output terminal OUTu via the high-side transistor TrH, and when it is in the output low state, the ground potential is applied to the output terminal OUTu via the low-side transistor TrL (where the transient state is ignored). Furthermore, a state in which both the transistors TrH and TrL are turned off will be referred to as an output high impedance state. In the output high impedance state, the supply of current to the coil 13u is stopped. The same applies to the half-bridge circuits 50v and 50w.

The BEMF comparator 53 compares a driving voltage V* of the SPM 13 (where * is at least one phase of u, v, and w, and the same applies hereinafter) with a neutral point voltage VCT to generate a comparison output signal COUT* and output it to the SPM controller 100. The comparison output signal COUT* is, for example, at a high level when V*>VCT, and at a low level when V*<VCT.

In addition, in a window section (=a high level period of the window signal WDW) where a half-bridge circuit 50* is in the output high impedance state, an induced voltage corresponding to a back electromotive force BEMF* is generated as the driving voltage V*. Therefore, the SPM controller 100 can detect a zero cross timing of the back electromotive force BEMF* by monitoring a pulse edge (=a rising edge or a falling edge) of the comparison output signal COUT* in the window section (details of which will be described later).

Furthermore, the neutral point voltage VCT may be derived from the neutral point 13n of the SPM 13, or may be pseudo-generated by synthesizing the three-phase driving voltages Vu, Vv, and Vw. When the BEMF comparator 53 generates all three-phase comparison output signals COUTu, COUTv, and COUTw, the three-phase driving voltages Vu, Vv, and Vw and the neutral point voltage VCT may be compared in parallel, or may be sequentially compared in time division.

The SPM controller 100 receives the input driving voltage V* and gate-source voltages Vgs* of the transistors TrH and TrL (and thus an information signal regarding a driving current I*), in addition to the comparison output signal COUT*, to generate the driving clock signal DRVCLK and the window signal WDW and output the same to the driving control signal generation circuit 52. Furthermore, the SPM controller 100 has a function of sending a back electromotive force detection signal BEMF (for example, raw data of the comparison output signal COUT* or various zero cross detection signals generated inside the SPM controller 100) to the MPU 22. The MPU 22 adjusts the torque command signal SDAC based on the back electromotive force detection signal BEMF. That is, a rotational speed control loop of the SPM 13 is formed by the SPM controller 100 and the MPU 22.

SPM Controller (First Embodiment)

Figure 5:
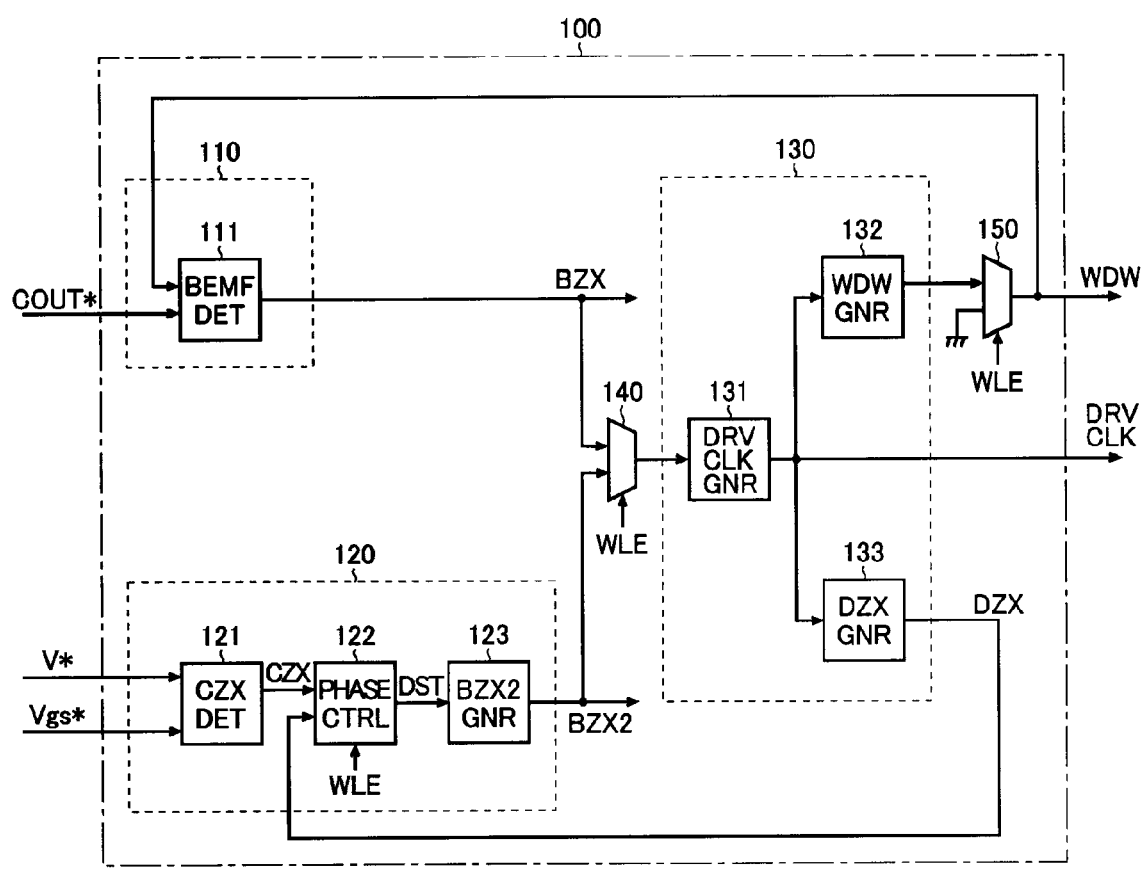
FIG. 5 is a diagram illustrating an SPM controller according to a first embodiment of the present disclosure.

FIG. 5 is a diagram illustrating an SPM controller 100 according to a first embodiment of the present disclosure. The SPM controller 100 of the present embodiment includes a window driving part 110, a windowless driving part 120, a signal processing part 130, and selectors 140 and 150.

The window driving part 110 is a functional block of implementing a window driving method (corresponding to a first driving method that performs driving control of the SPM 13 based on a zero cross timing of a back electromotive force BEMF* (which may be understood as an induced voltage) generated in a coil 13* of a predetermined phase), and includes a BEMF detection part 111.

The BEMF detection part 111 detects a zero cross timing of the back electromotive force BEMF* generated in the coil 13* from a pulse edge (=a rising edge or a falling edge) of the comparison output signal COUT* in the window section (=a high level period of the window signal WDW) where the half-bridge circuit 50* is in the output high impedance state to generate a BEMF zero cross detection signal BZX. In addition, the zero cross timing detected here may be a timing at which the back electromotive force BEMF* is switched from negative to positive, or may be a timing at which the back electromotive force BEMF* is switched from positive to negative. The BEMF zero cross detection signal BZX is at a low level in principle, and is a pulse signal that rises to a high level every time the zero cross timing of the back electromotive force BEMF* is detected.

The windowless driving part 120 is a functional block of implementing a windowless driving method (corresponding to a second driving method that performs driving control of the SPM 13 so that a differential phase ERR_CD between the zero cross timing of the driving current I* flowing through the coil 13* of a predetermined phase and the zero cross timing of the driving voltage V* applied to the coil 13* of a predetermined phase coincides with a predetermined target phase TP_CD), and includes a driving current zero cross detection part 121, a phase control part 122, and a signal output part 123.

In addition, when the driving voltage V* is pulse-width modulated based on the driving control signal DRV*, the expression "zero cross timing of the driving voltage V*" may be understood as a timing at which an AC voltage waveform obtained by smoothing the driving voltage V* intersects with a neutral point voltage VCT, rather than as a timing at which the driving voltage V* itself intersects with the neutral point voltage VCT. Alternatively, it may be understood as a timing at which the AC voltage waveform to be applied to output terminals OUTu, OUTv, and OUTw to supply sinusoidal driving currents Iu, Iv, and Iw intersects with the neutral point voltage VCT. In this case, the zero cross timing of the driving voltage V* coincides with a timing at which an on duty (=a ratio of a high level period in one cycle) of the driving control signal DRV* takes the center value of its variable range.

The driving current zero cross detection part 121 detects a zero cross timing of the driving current I* flowing through the coil 13* from the driving voltage V* and the gate-source voltages Vgs* of the transistors TrH and TrL (and thus the information signal regarding the driving current I*) to generate a driving current zero cross detection signal CZX. In addition, the zero cross timing detected here may be a timing at which the driving current I* is switched from negative to positive, or may be a timing at which the driving current I* is switched from positive to negative. The driving current zero cross detection signal CZX is a low level in principle, and is a pulse signal that rises to a high level every time the zero cross timing of the driving current I* is detected.

The phase control part 122 receives the input driving current zero cross detection signal CZX and DRV zero cross detection signal DZX to generate a driving state time DST for setting a driving frequency f in a next driving cycle. In addition, the phase control part 122 has a function of receiving the input windowless driving enable signal WLE and of appropriately setting the target phase TP_CD at the time of transition from the window driving method to the windowless driving method. This will be described in detail later.

The signal output part 123 outputs a virtual BEMF zero cross detection signal BZX2 based on the driving state time DST input from the phase control part 122. Similar to the BEMF zero cross detection signal BEMF, the virtual BEMF zero cross detection signal BZX2 includes position information of the rotor, and after the transition from the window driving method to the windowless driving method, instead of the BEMF zero cross detection signal BZX, it is input to the signal processing part 130.

The signal processing part 130 is a functional block of generating the driving clock signal DRVCLK and the window signal WDW based on a selection output signal (=one of the BEMF zero cross detection signal BZX and the virtual BEMF zero cross detection signal BZX2) of the selector 140, and includes a driving clock signal generation part 131, a window signal generation part 132, and a DRV zero cross detection signal generation part 133.

The driving clock signal generation part 131 generates the driving clock signal DRVCLK by multiplying the selection output signal of the selector 140 by m (e.g., m=6), and outputs the same to the driving control signal generation circuit 52. The driving control signal generation circuit 52 may generate the driving signals DRVu, DRVv, and DRVw for driving the SPM 13 in a desired manner using the driving clock signal DRVCLK. For example, the driving control signal generation circuit 52 derives U-phase, V-phase, and W-phase target voltages to be applied to the output terminals OUTu, OUTv, and OUTw to supply the sinusoidal driving currents Iu, Iv, and Iw to the coils 13u, 13v, and 13w, respectively, based on the driving clock signal DRVCLK and the predetermined waveform data, and generates the driving control signals DRVu, DRVv, and DRVw by performing pulse width modulation on signals indicating the U-phase, V-phase, and W-phase target voltages. Accordingly, the U-phase, V-phase, and W-phase driving voltages Vu, Vv, and Vw, which are voltages obtained by performing the pulse width modulation on the U-phase, V-phase, and W-phase target voltages, are applied to the output terminals OUTu, OUTv, and OUTw, realizing desired driving of the SPM 13.

The window signal generation part 132 generates the window signal WDW in synchronization with the driving clock signal DRVCLK. The window signal WDW is at a high level before the zero cross timing of the back electromotive force BEMF* arrives, and is returned to a low level when the zero cross timing of the back electromotive force BEMF* is detected.

The DRV zero cross detection signal generation part 133 derives a timing at which the on duty of the driving control signal DRV* takes the center value of its variable range from the driving clock signal DRVCLK, and generates the DRV zero cross detection signal DZX corresponding to the zero cross timing of the driving voltage V*. The zero cross timing detected here may be a timing at which the driving voltage V* is switched from negative to positive, or may be a timing at which the driving voltage V* is switched from positive to negative. The DRV zero cross detection signal DZX is a low level in principle, and is a pulse signal that rises to a high level every time the zero cross timing of the driving voltage V* is detected.

The selector 140 selects one of the BEMF zero cross detection signal BZX and the virtual BEMF zero cross detection signal BZX2 depending on a windowless driving enable signal SLE, and outputs the selected signal to the signal processing part 130. The windowless driving enable signal SLE is, for example, at a low level during the window driving and at a high level during the windowless driving. In this case, the selector 140 may selectively output the BEMF zero cross detection signal BZX when SLE=L, and may selectively output the virtual BEMF zero cross detection signal BZX2 when SLE=H.

The selector 150 outputs the window signal WDW through when SLE=L, and fixes the window signal WDW to a low level when SLE=H.

Window Driving Method

Figure 6:
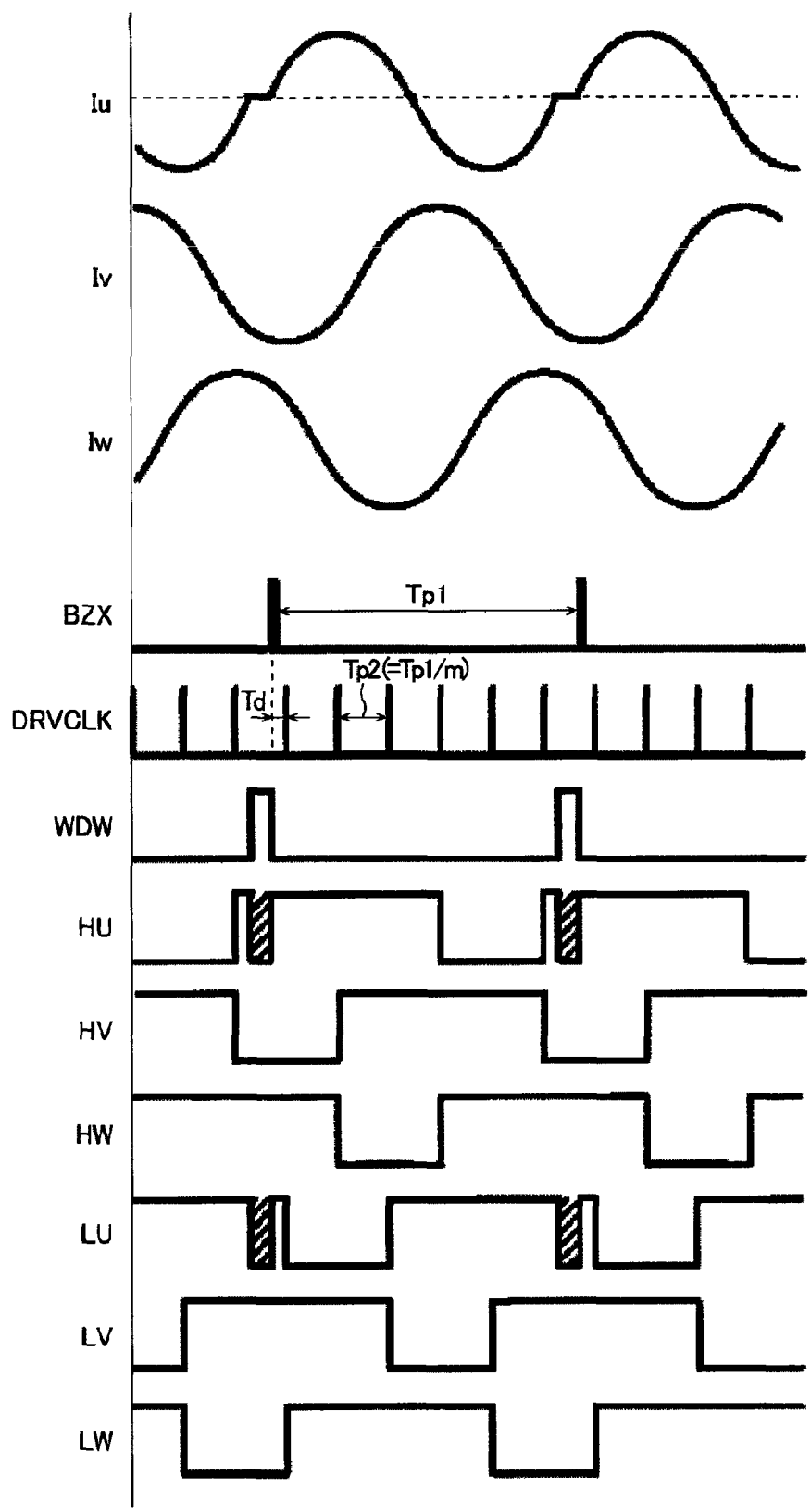
FIG. 6 is a diagram illustrating a basic operation of a window driving method.

FIG. 6 is a diagram illustrating a basic operation of the window driving method using the window driving part 110, in which the driving currents Iu, Iv and Iw, the BEMF zero cross detection signal BZX, the driving clock signal DRVCLK, the window signal WDW, gate signals HU, HV and HW of the high-side transistors TrH of the respective phases, and gate signals LU, LV and LW of the low-side transistors TrL of the respective phases are depicted sequentially from the top. Furthermore, in order to facilitate understanding of this drawing, the vertical axis and the horizontal axis are appropriately enlarged or reduced and each waveform is also appropriately simplified.

In this drawing, the driving currents Iu, Iv, and Iw are driven so as to become sinusoidal waves shifted by 120 degrees from one another using waveform data SIN of the sinusoidal wave. Furthermore, a pulse is raised in the BEMF zero cross detection signal BZX at every zero cross timing (=every pulse period Tp1) at which a back electromotive force BEMFu intersects with the neutral point voltage VCT.

The driving clock signal DRVCLK is generated by multiplying the BEMF zero cross detection signal BZX by m (e.g., m=6). Therefore, a pulse width Tp2 of the driving clock signal DRVCLK is 1/m of the pulse period Tp1 of the BEMF zero cross detection signal BZX. Furthermore, the waveform data SIN described above is generated in synchronization with the driving clock signal DRVCLK. Accordingly, each of the driving currents Iu, Iv, and Iw is controlled in synchronization with the BEMF zero cross detection signal BZX.

In addition, a predetermined delay Td may be given to the driving clock signal DRVCLK with respect to the BEMF zero cross detection signal BZX as illustrated in the drawing. The motor driving can be optimized by adjusting the delay Td.

Each of the high-side gate signals HU, HV, and HW and the low-side gate signals LU, LV, and LW is generated in synchronization with the driving clock signal DRVCLK. For the gate signals HU, HV, and HW, a high level corresponds to the ON state of the transistor TrH and a low level corresponds to the OFF state of the transistor TrH. Similarly, for the gate signals LU, LV, and LW, a high level corresponds to the ON state of the transistor TrL and a low level corresponds to the OF state of the transistor TrL. Furthermore, although not explicitly shown in this drawing, the ON state of at least one of the transistors TrH and TrL is pulse-width modulated so that the driving currents Iu, Iv, and Iw become sinusoidal waveforms.

The window signal WDW is at a high level before the zero cross timing of the back electromotive force BEMFu arrives. In a high level period of the window signal WDW, the driving control signal generation circuit 52 sets all the gate signals HU and LU to a low level, and sets the U-phase half-bridge circuit 50u to be in the output high impedance state (see hatching regions in the drawing). As a result, the driving current Iu does not flow through the coil 13u and an induced voltage corresponding to the back electromotive force BEMFu is generated at the output terminal OUTu. Thus, the zero cross timing of the back electromotive force BEMFu can be detected. Furthermore, when the zero cross timing of the back electromotive force BEMFu arrives and the BEMF zero cross detection signal BZX rises to a high level, the window signal WDW is returned to a low level.

In addition, there has been described an example in which the zero crossing timing of the back electromotive force BEMFu in the U phase is detected in this drawing, but a predetermined phase in which the zero crossing timing of the back electromotive force is detected may be the V phase or the W phase. Each of two or more of the U phase, V phase and W phase may be the predetermined phase.

Figure 7:
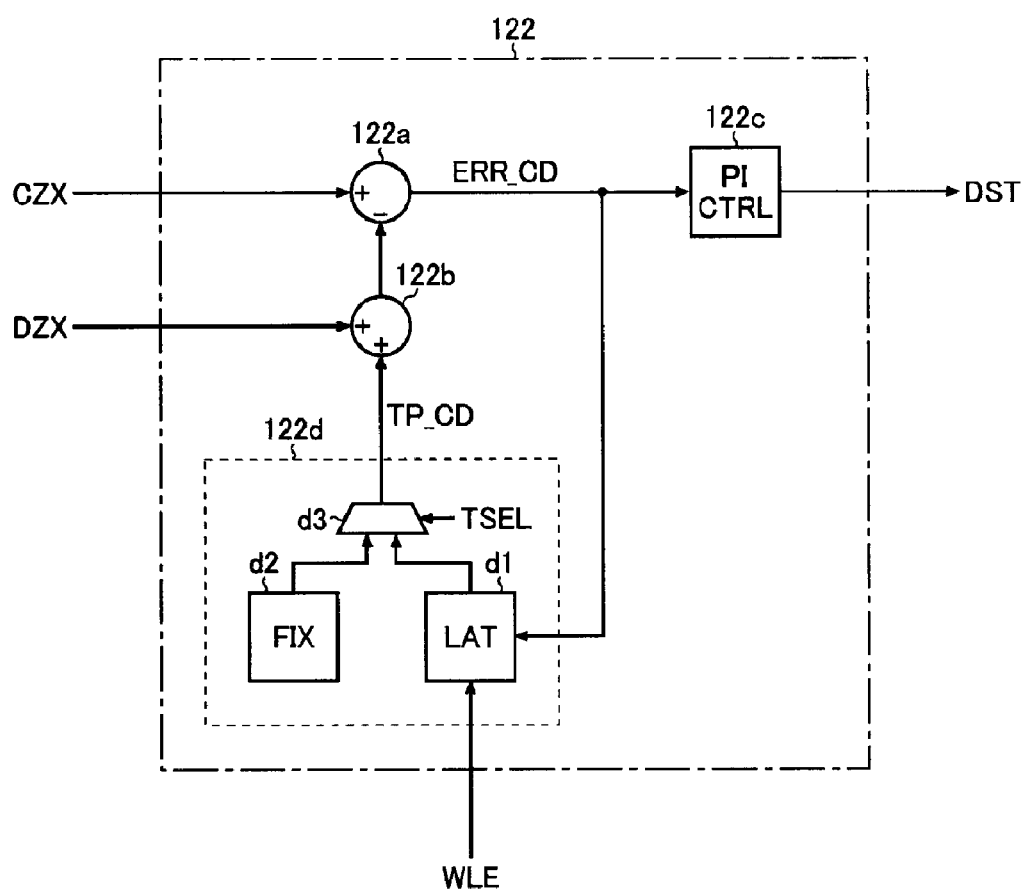
FIG. 7 is a diagram illustrating a configuration example of a phase control part.

Furthermore, the window driving method described above cannot be used when the rotor is completely stopped. Therefore, when the SPM 13 starts, first, some degree of rotational force may be applied to the rotor by a known forced commutation method, and then, the transition to the window driving method is performed Windowless Driving Method FIG. 7 is a diagram illustrating a configuration example of the phase control part 122 included in the windowless driving part 120. The phase control part 122 of this configuration example includes a subtractor 122a, an adder 122b, a PI control part 122c, and a target phase setting part 122d.

The subtractor 122a subtracts an output signal (=DZX+TP_CD) of the adder 122b from the driving current zero cross detection signal CZX (=phase information corresponding to the zero cross timing of the driving current I*) to derive a differential phase ERR_CD between the zero cross timing of the driving current I* and the zero cross timing of the driving voltage V*.

The adder 122b adds the target phase TP_CD to the DRV zero cross detection signal DZX (=phase information corresponding to the zero cross timing of the driving voltage V*) to output the addition result (=DZX+TP_CD) to the subtractor 122a.

The PI control part 122c receives the input differential phase ERR_CD to derive a deviation P (=ERR_CD) for the target phase TP_CD and the driving state time DST described above by feedback control according to its integration I. A P gain and an I gain may also be arbitrarily set via the IF circuit 32.

The target phase setting part 122d is a functional block of setting the target phase TP_CD input to the adder 122b, and includes a latch part d1, a fixed value storage part d2, and a selector d3.

The latch part d1 receives the input differential phase ERR_CD, and at the transition from the window driving method to the windowless driving method (=a timing at which the windowless driving enable signal WLE rises to a high level), the latch part d1 holds, as the target phase TP_CD, the differential phase ERR_CD detected immediately before the transition. Furthermore, an initial output value of the latch part d1 may be set to 0 (or a fixed value stored in the fixed value storage part d2). The significance of introducing the latch part d1 will be described in detail later.

The fixed value storage part d2 stores the fixed value (e.g., 0) of the target phase TP_CD.

The selector d3 selects either the latch part d1 or the fixed value storage part d2 depending on a target phase selection signal TSEL to output its output value as the target phase TP_CD. For example, the selector d3 selectively outputs the stored value (ERR_CD) of the latch part d1 when TSEL=H, and selectively outputs the stored value (0) of the fixed value storage part d2 when TSEL=L.

As described above, since the target phase setting part 122d includes the fixed value storage part d2 and the selector d3 in addition to the latch part d1, it may select the fixed value as the target phase TP_CD when TSEL=L.

Figure 8:
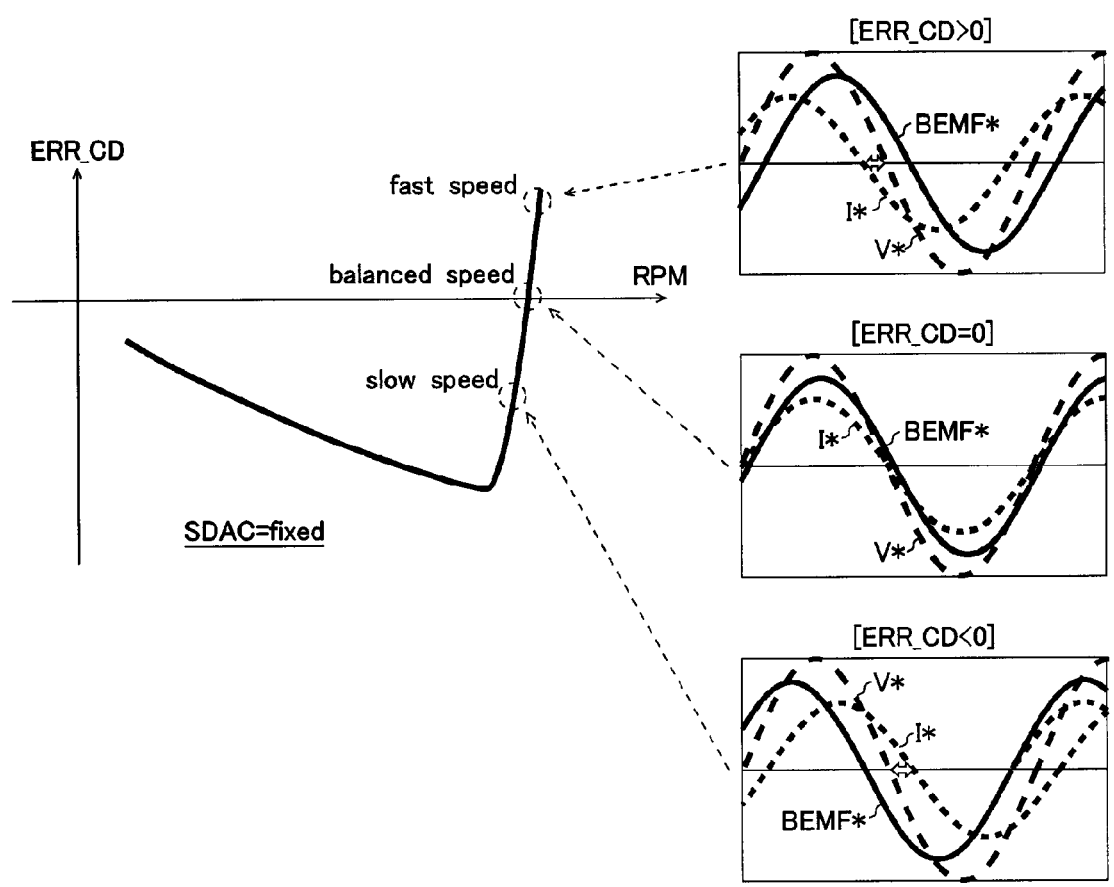
FIG. 8 is a diagram illustrating a basic operation of a windowless driving method.

FIG. 8 is a diagram illustrating a basic operation of the windowless driving method using the windowless driving part 120. The left side of the drawing shows a relationship between the rotational speed RPM of the SPM 13 and the differential phase ERR_CD under the assumption that SDAC=fixed value. Furthermore, the right side of the drawing shows smooth waveforms of the back electromotive forces BEMF* (solid lines), the driving current I* (small broken lines) and the driving voltage V* (large broken lines) when ERR_CD>0, when ERR_CD=0, and when ERR_CD<0, respectively, under the assumption that TP_CD=0.

As illustrated in this drawing, in a motorless driving method, when ERR_CD>0 (=when the zero cross timing of the driving current I* is earlier than the zero cross timing of the driving voltage V*), the rotational speed RPM of the SPM 13 is lowered by decreasing the driving frequency f Conversely, when ERR_CD<0 (=when the zero cross timing of the driving current I* is later than the zero cross timing of the driving voltage V*), the rotational speed RPM of the SPM 13 is raised by increasing the driving frequency f.

As described above, in the motorless driving method, the rotational speed RPM of the SPM 13 can be balanced so that ERR_CD=TP_CD by adjusting the driving frequency f according to a magnitude relationship between the differential phase ERR_CD and the target phase TP_CD.

Transition Sequence (First Embodiment)

Figure 9:
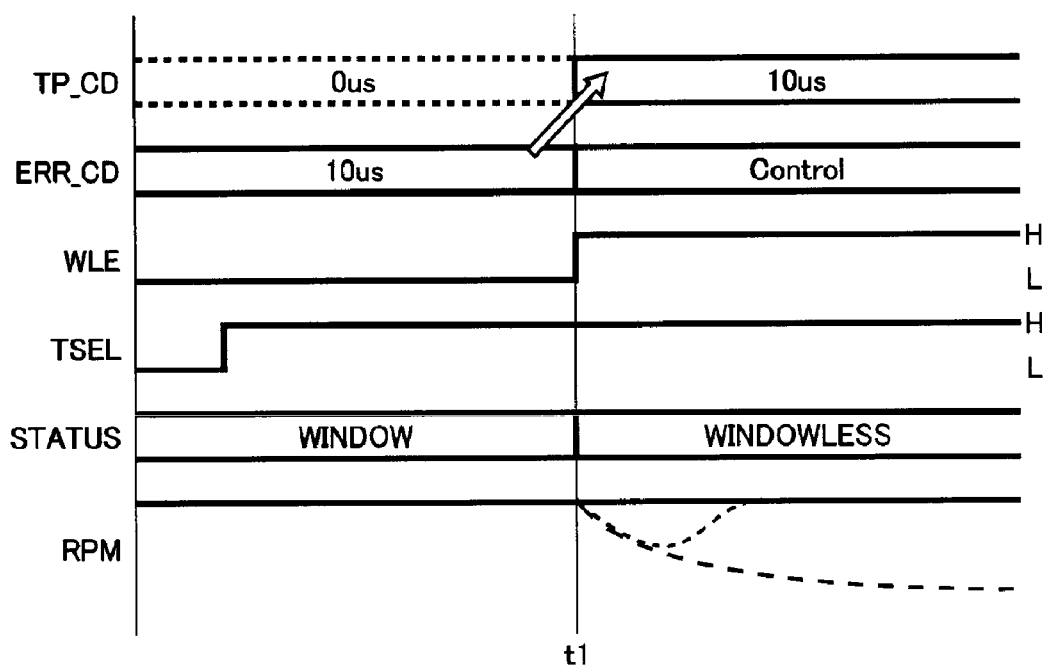
FIG. 9 is a diagram illustrating a transition sequence of a driving method according to the first embodiment of the present disclosure.

FIG. 9 is a diagram illustrating a transition sequence of the driving method according to the first embodiment, in which the target phase TP_CD, the differential phase ERR_CD, the windowless driving enable signal WLE, the target phase selection signal TSEL, the switching state of the driving method (window driving method/windowless driving method), and the rotational speed RPM of the SPM 13 are depicted sequentially from the top.

Since the windowless driving enable signal WLE is at a low level before time t1, the rotational speed RPM is maintained at a desired target value by the driving control of the SPM 13 by the window driving method.

Furthermore, even while the SPM 13 is driven by the window driving method, the windowless driving part 120 sequentially detects a differential phase ERR_CD (10 µs in this drawing) between the zero cross timing of the driving current I* and the zero cross timing of the driving voltage V*.

Thereafter, when the windowless driving enable signal WLE rises to a high level at the time t1, the driving method of the SPM 13 transitions from the window driving method to the windowless driving method. Furthermore, in some embodiments, the windowless driving enable signal WLE may rise to a high level after the rotational speed RPM of the SPM 13 is stabilized by the window driving method.

As described above, the transition from the window driving method to the windowless driving method can achieve both securement of the stable operation immediately after the start of the SPM 13 (=advantage of the window driving method), and noise reduction and vibration suppression in a steady state (=advantage of the windowless driving method).

However, generally, the differential phase ERR_CD immediately before the transition from the window driving method to the windowless driving method may vary due to various factors (such as the driving state of the SPM 13, manufacturing variations and the like). Therefore, when the target phase TP_CD is a fixed value, the driving control of the SPM 13 by the windowless driving method may start from a state in which the differential phase ERR_CD and the target phase TP_CD are largely deviated, causing an unintentional variation in the rotational speed RPM of the SPM 13.

On the other hand, in the transition sequence of the driving method according to the first embodiment, when the target phase selection signal TSEL is at a high level, at the transition from the window driving method to the windowless driving method (=time t1), the differential phase ERR_CD (10 µs in this drawing) detected immediately before the transition is set as the target phase TP_CD.

Therefore, since the driving control of the SPM 13 by the windowless driving method can start from the state in which the differential phase ERR_CD and the target phase TP_CD completely coincide with each other, the transition from the window driving method to the windowless driving method can be smoothly performed.

Furthermore, if attention is paid to the rotational speed RPM of the SPM 13, when the target phase TP_CD is a fixed value, the rotational speed RPM deviates from the target speed due to the transition of the window driving method to the windowless driving method as indicated by a small broken line (SDAC variable) or a large broken line (SDAC fixed). On the other hand, when the differential phase ERR_CD detected immediately before the transition is set as the target phase TP_CD, the rotational speed RPM can be maintained at the target speed even at the transition from the window driving method to the windowless driving method as indicated by a solid line.

SPM Controller (Second Embodiment)

Figure 10:
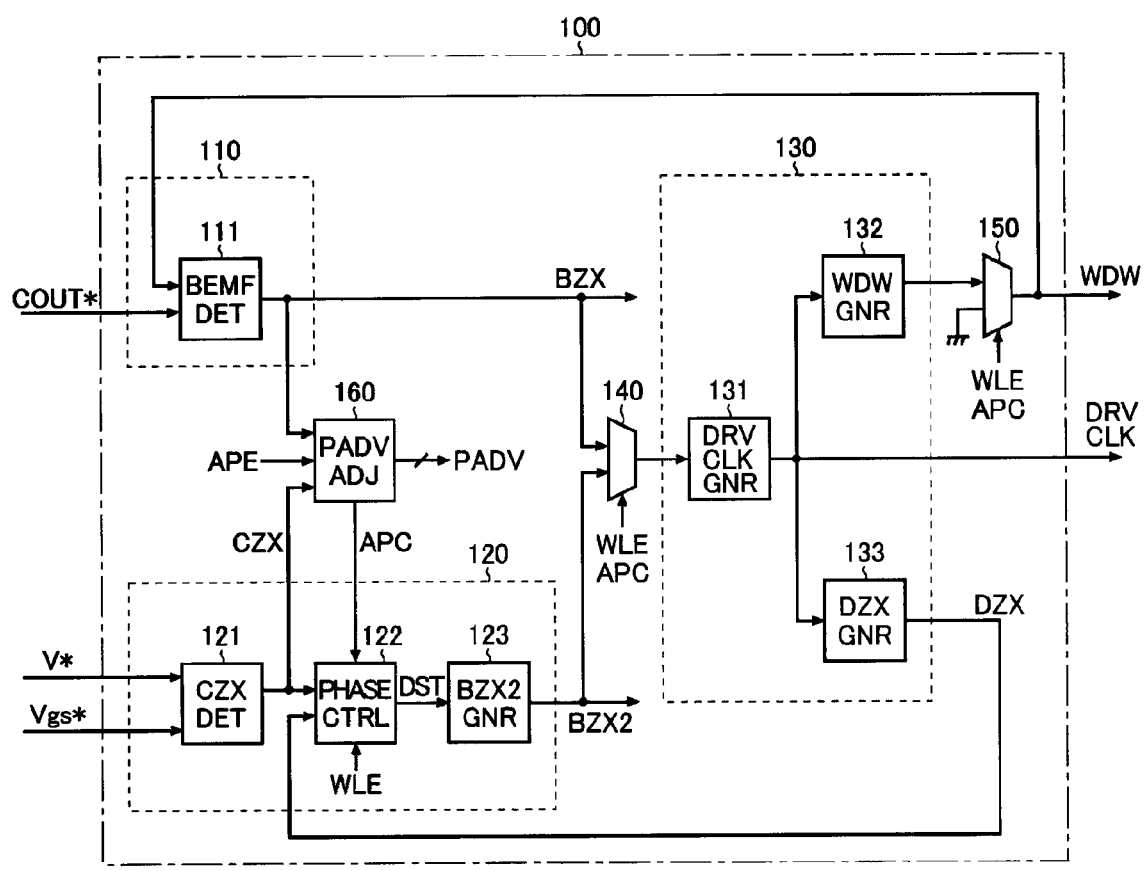
FIG. 10 is a diagram illustrating the SPM controller according to a second embodiment of the present disclosure.

FIG. 10 is a diagram illustrating a second embodiment of the SPM controller 100. The SPM controller 100 of the present embodiment is based on the first embodiment (FIG. 5) described above, and further includes an automatic advance adjustment part 160. Therefore, the existing components are denoted by the same reference numerals as those in FIG. 5 and a repeated description thereof will be omitted. An operation of the automatic advance adjustment part 160 and changes added to the transition sequence of the driving method according to its introduction will be described in detail below.

The automatic advance adjustment part 160 receives the input BEMF zero cross detection signal BZX and the driving current zero cross detection signal CZX, and performs an automatic advance adjustment operation (=automatic adjustment of advance amount PADV) so that the differential phase ERR_BC between the zero cross timing of the back electromotive force BEMF* and the zero cross timing of the driving current I* becomes equal to the target phase TP_BC (e.g., 0 µs) while driving the SPM 13 by the window driving method.

Furthermore, the automatic advance adjustment part 160 can switch ON and OFF of the automatic advance adjustment operation depending on an automatic advance adjustment enable signal APE. More specifically, the automatic advance adjustment operation is turned off when APE=L, and the automatic advance adjustment operation is turned on when APE=H.

The automatic advance adjustment part 160 also has a function of outputting an automatic advance adjustment completion signal APC to each of the phase control part 122 and the selectors 140 and 150. In addition, the automatic advance adjustment completion signal APC is at a low level when the automatic advance adjustment operation is not completed, and is at a high level when the automatic advance adjustment operation is completed.

The selectors 140 and 150 wait for the transition from the window driving method to the windowless driving method until the automatic advance adjustment completion signal APC is raised to a high level even if the windowless driving enable signal WLE is raised to a high level.

Furthermore, the phase control part 122 waits for the latch operation of the differential phase ERR_CD until the automatic advance adjustment completion signal APC is raised to a high level even if the windowless driving enable signal WLE is raised to a high level.

However, when the automatic advance adjustment enable signal APE is at a low level, the waiting operation described above is not performed even if the automatic advance adjustment completion signal APC is at a low level. These waiting operations will be described later as the changes in the transition sequence.

Figure 11:
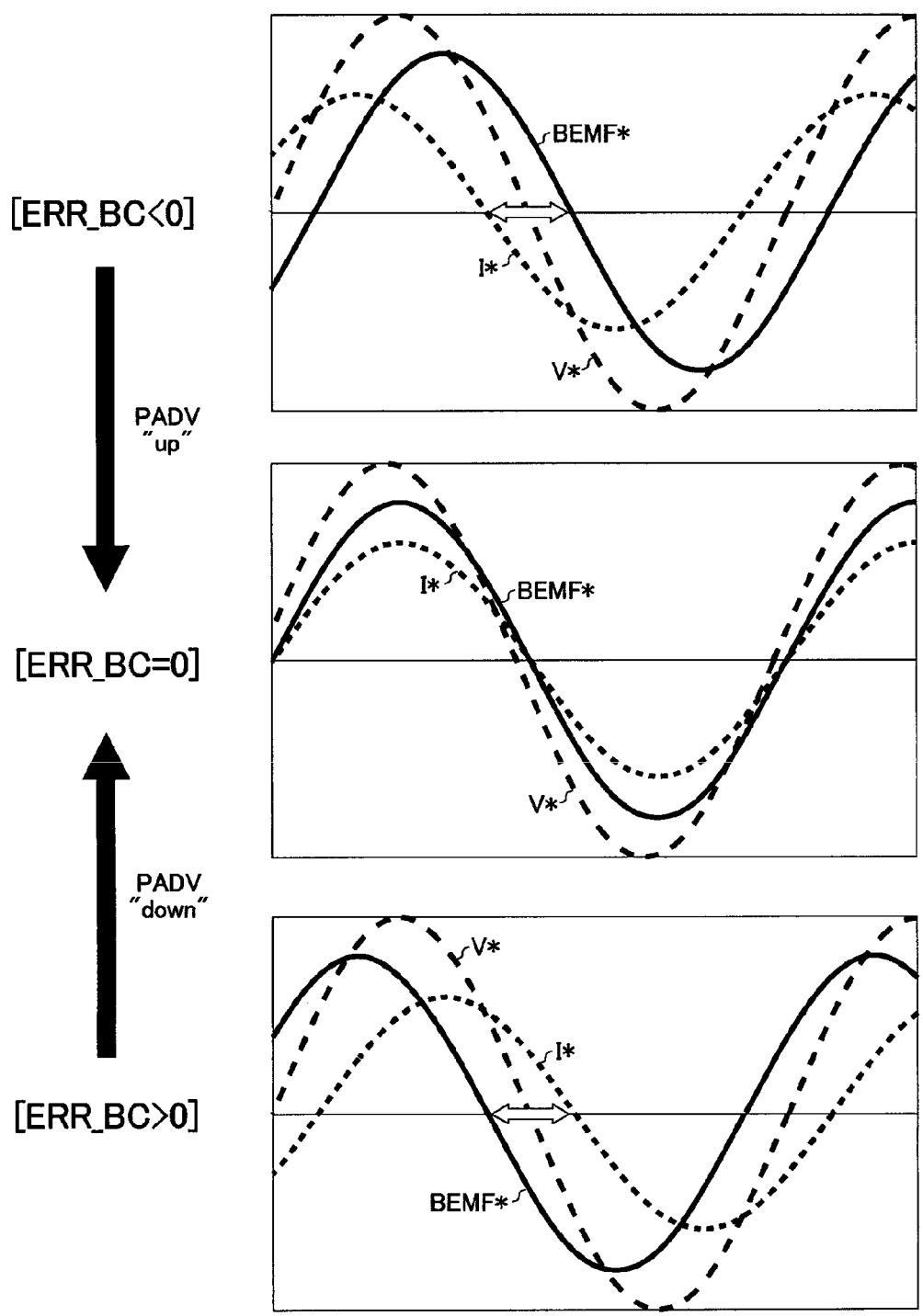
FIG. 11 is a diagram illustrating an example of automatic advance adjustment operation.

FIG. 11 is a diagram illustrating an example of the automatic advance adjustment operation by the automatic advance adjustment part 160, in which smooth waveforms of the back electromotive force BEMF* (solid line), the driving current I* (small broken line), and the driving voltage V* (large broken line) are respectively depicted when ERR_BC<0, when ERR_BC=0, and when ERR_BC>0 under the assumption that TP_BC=0.

As illustrated in this drawing, in the automatic advance adjustment operation, when ERR_BC>0 (=when the zero cross timing of the back electromotive force BEMF* is earlier than the zero cross timing of the driving current I*), the advance amount PADV is decreased, whereas when ERR_BC<0 (=when the zero cross timing of the back electromotive force BEMF* is later than the zero cross timing of the driving current I*), the advance amount PADV is increased.

The advance amount PADV corresponds to a differential phase (=BCX−DCX) between the zero cross timing of the back electromotive force BEMF* and the zero cross timing of the driving voltage V*.

Thus, in the automatic advance adjustment operation, it is possible to realize ERR_BC=TP_BC (=0) by adjusting the advance amount PADV according to a magnitude relationship between the differential phase ERR_BC and the target phase TP_BC.

Transition Sequence (Second Embodiment)

Figure 12:
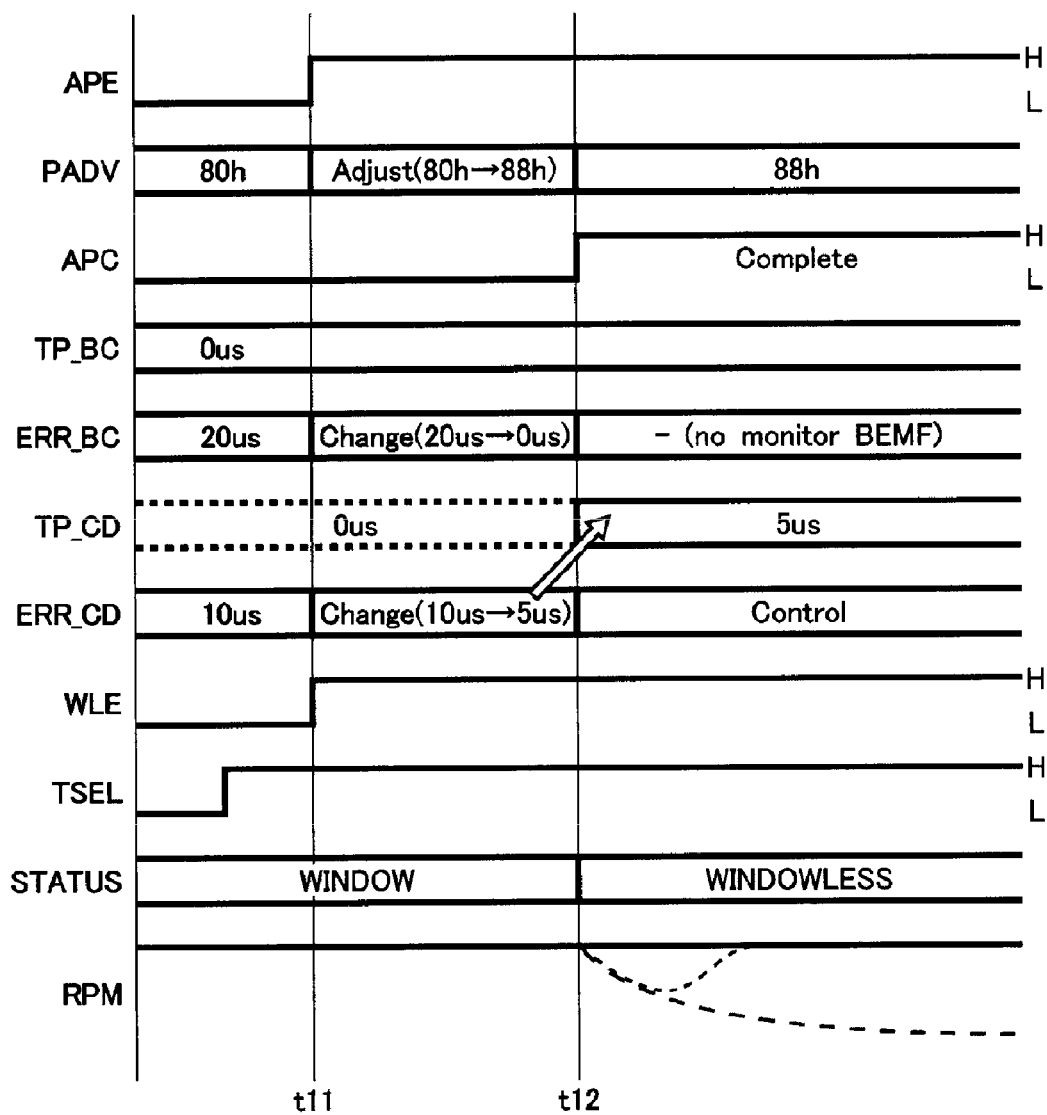
FIG. 12 is a diagram illustrating a transition sequence of a driving method according to the second embodiment of the present disclosure.

FIG. 12 is a diagram illustrating a transition sequence of the driving method according to the second embodiment of the present disclosure, in which the automatic advance adjustment enable signal APE, the advance amount PADV, the automatic advance adjustment completion signal APC, the target phase TP_BC, the differential phase ERR_BC, the target phase TP_CD, the differential phase ERR_CD, the windowless driving enable signal WLE, the target phase selection signal TSEL, the status of the driving method (window driving method/windowless driving method), and the rotational speed RPM of the SPM 13 are depicted sequentially from the top.

Since the windowless driving enable signal WLE is at a low level before time t11, the rotational speed RPM is maintained at a desired target value by the driving control of the SPM 13 by the window driving method.

Furthermore, since the automatic advance adjustment enable signal APE is also at a low level before the time t11, the differential phase ERR_BC (20 μs in this drawing) does not coincide with the target phase TP_BC (0 μs in this drawing), and the advance amount PADV (80 h in this drawing) also remains unadjusted. The automatic advance adjustment completion signal APC is also naturally maintained at a low level (=a logical level when not completed).

In addition, even while the SPM 13 is driven by the window driving method, the windowless driving part 120 sequentially detects the difference phase ERR_CD (10 μs in this drawing) between the zero cross timing of the driving current I* and the zero cross timing of the driving voltage V*. In this respect, there is no difference from the previous FIG. 9.

Thereafter, when the automatic advance adjustment enable signal APE rises to a high level at the time t11, the automatic advance adjustment operation starts. Specifically, the advance amount PADV is gradually adjusted so that the differential phase ERR_BC coincides with the target phase TP_BC (ERR_BC=20 μs→0 μs, PADV=80 h→88 h in this drawing).

Further, the differential phase ERR_CD is gradually changed according to the aforementioned automatic advance adjustment operation (ERR_CD=10 μs→5 μs in this drawing).

Furthermore, in this drawing, the windowless driving enable signal WLE is also raised to a high level at the time t11. However, both the transition from the window driving method to the windowless driving method and the latching operation of the differential phase ERR_CD (=setting operation of the target phase TP_CD) await until the automatic advance adjustment completion signal APC is raised to a high level.

Thereafter, when the automatic advance adjustment operation is completed and the automatic advance adjustment completion signal APC rises to a high level at time t12, the driving method of the SPM 13 transitions from the window driving method to the windowless driving method.

Furthermore, at this time, the differential phase ERR_CD (5 μs in this drawing) detected immediately before the transition is set as the target phase TP_CD.

Accordingly, since the driving control of the SPM 13 by the windowless driving method can start from the state in which the differential phase ERR_CD and the target phase TP_CD completely coincide with each other, the transition from the window driving method to the windowless driving method can be smoothly performed. This is similar to the first embodiment described above.

Modification

In the half-bridge circuit 50* including the transistors TrH and TrL, the drain of the transistor TrH is connected to the first power supply terminal, and the source of the transistor TrL is connected to the second power supply terminal, in which the first power supply terminal and the second power supply terminal are optional as long as they are terminals having a fixed potential. However, the potential at the first power supply terminal is higher than the potential at the second power supply terminal. Furthermore, in each half-bridge circuit 50*, a diode having a forward direction from the node ND to the first power supply terminal, in addition to a parasitic diode of the transistor TrH, may be connected in parallel to the transistor TrH, and a diode having a forward direction from the second power supply terminal to the node ND, in addition to a parasitic diode of the transistor TrL may be connected in parallel to the transistor TrL.

The driving control signal generation circuit 52 is configured to generate the driving control signals (DRVu, DRVv, and DRVw) based on the driving clock signal DRVCLK, the window signal WDW, and the torque command signal SDAC, but the torque command signal SDAC may be unnecessary in a case where the torque to be generated by the SPM 13 is predetermined.

Although an example in which the SPM 13 includes the coils of three phases has been described above, the SPM 13 may include coils of multiple phases different from the three phases.

Each component of the driver IC 30 is formed in the form of a semiconductor integrated circuit, and a semiconductor device is configured by enclosing the semiconductor integrated circuit in a housing (package) made of resin. However, circuits equivalent to the circuits in the driver IC 30 may be configured using a plurality of discrete components. Alternatively, the SPM driver 33 alone may be formed in the form of a semiconductor integrated circuit, and a semiconductor device may be configured by enclosing the semiconductor integrated circuit in a housing (package) made of resin.

In the aforementioned embodiment, there has been described an example in which the present disclosure is applied to the motor driver device (driver IC 30) for the SPM 13 of the HDD device 1, but the present disclosure is widely applicable to any motor driver device that drives a motor. For example, the present disclosure may be applied to a motor driver device for driving a fan motor for air cooling.

Each half-bridge circuit 50* may be modified so that the transistor TrH includes a P-channel MOSFET. Further, the transistor TrL may include a P-channel MOSFET.

Each transistor described above may be any type of transistor. For example, the transistor illustrated as the MOSFET may be replaced with a junction type FET, an insulated gate bipolar transistor (IGBT) or a bipolar transistor in a manner that does not impair the subject matters of the present disclosure described above. Any transistor has a first electrode, a second electrode, and a control electrode. In the FET, one of the first and second electrodes is a drain, the other is a source, and the control electrode is a gate. In the IGBT, one of the first and second electrodes is a collector, the other is an emitter, and the control electrode is a gate. In the bipolar transistor which does not belong to the IGBT, one of the first and second electrodes is a collector, the other is an emitter, and the control electrode is a base.

Other Modifications

Furthermore, various technical features disclosed herein may be variously modified without departing from the spirit of the present disclosure, in addition to the aforementioned embodiments. That is, the aforementioned embodiments should be considered to be illustrative and not restrictive in all respects, and the technical scope of the present disclosure is not limited to the aforementioned embodiments but is to be understood to include all modifications that belong to the meaning and scope equivalent to the accompanying claims.

The disclosure disclosed herein can be widely used for all motor driver devices that perform driving control of a motor in a sensorless manner.

According to the embodiments of the present disclosure, it is possible to provide a motor driver device capable of smoothly performing a transition from a window driving method to a windowless driving method.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A motor driver device, comprising:
a driver configured to drive a motor by a driving method, wherein the driving method includes:
a first driving method that performs driving control of the motor based on a zero cross timing of a back electromotive force generated in a coil of a predetermined phase; and
a second driving method that performs driving control of the motor such that a first differential phase between a zero cross timing of a driving current flowing through the coil of the predetermined phase and a zero cross timing of a driving voltage applied to the coil of the predetermined phase coincides with a predetermined first target phase, and
wherein, even when the motor is being driven by the first driving method, the first differential phase is sequentially detected and, when a transition from the first driving method to the second driving method occurs, the first differential phase detected immediately before the transition is set to the predetermined first target phase, and
wherein, in the second driving method, when the first differential phase is larger than the predetermined first target phase, a rotational speed of the motor is lowered, and when the first differential phase is smaller than the predetermined first target phase, the rotational speed of the motor is raised.

2. The motor driver device of claim 1, wherein the transition from the first driving method to the second driving method occurs after the rotational speed of the motor is stabilized by the first driving method.

3. The motor driver device of claim 1, wherein a fixed value is selectable as the predetermined first target phase.

4. The motor driver device of claim 1, wherein, when the motor is being driven by the first driving method, an advance adjustment operation is performed to adjust an advance amount that indicates a second differential phase between the zero cross timing of the back electromotive force and the zero cross timing of the driving current such that the second differential phase coincides with a predetermined second target phase.

5. A semiconductor device formed by integrating the motor driver device of claim 1.

6. The motor driver device of claim 4, wherein the transition from the first driving method to the second driving method awaits until the advance adjustment operation is completed.

7. The motor driver device of claim 4, wherein, in the advance adjustment operation, when the second differential phase is larger than the predetermined second target phase, the advance amount is decreased, and when the second differential phase is smaller than the predetermined second target phase, the advance amount is increased.

8. An electronic device, comprising:
the semiconductor device of claim 5; and
the motor driven by using the semiconductor device.

9. The electronic device of claim 8, wherein the motor is a spindle motor configured to rotate a disk.

* * * * *